United States Patent
Velthaus et al.

(10) Patent No.: US 10,247,998 B2
(45) Date of Patent: Apr. 2, 2019

(54) ELECTRO-OPTIC MACH-ZEHNDER MODULATOR AND METHOD FOR FABRICATING AN ELECTRO-OPTIC MACH-ZEHNDER MODULATOR

(75) Inventors: Karl-Otto Velthaus, Kleinmachnow (DE); Detlef Hoffmann, Berlin (DE); Marko Gruner, Berlin (DE)

(73) Assignee: FRAUNHOFER-GESELLSCHAFT ZUR FÖRDERUNG DER ANGEWANDTEN FORSCHUNG E.V., München (DE)

( * ) Notice: Subject to any disclaimer, the term of this patent is extended or adjusted under 35 U.S.C. 154(b) by 577 days.

(21) Appl. No.: 14/127,927

(22) PCT Filed: Jun. 20, 2012

(86) PCT No.: PCT/EP2012/061817
§ 371 (c)(1),
(2), (4) Date: Mar. 26, 2014

(87) PCT Pub. No.: WO2012/175551
PCT Pub. Date: Dec. 27, 2012

(65) Prior Publication Data
US 2014/0199014 A1    Jul. 17, 2014

(30) Foreign Application Priority Data
Jun. 20, 2011    (EP) .................... 11170538

(51) Int. Cl.
*G02F 1/025* (2006.01)
*G02F 1/225* (2006.01)
*G02F 1/21* (2006.01)

(52) U.S. Cl.
CPC ............ *G02F 1/225* (2013.01); *G02F 1/025* (2013.01); *G02F 1/2255* (2013.01);
(Continued)

(58) Field of Classification Search
USPC .................. 385/1–3; 359/237, 238, 248, 254
See application file for complete search history.

(56) References Cited

U.S. PATENT DOCUMENTS

2009/0297088 A1* 12/2009 Koh ................................. 385/2
2010/0150494 A1    8/2010 Prosyk et al.

OTHER PUBLICATIONS

"Traveling wave electrodes for 50 GHz operation of opto-electronic devices based on InP" by Morl et al, 11th International Conference on Indium Phosphide and Related Materials, paper WeA1-3, pp. 385-388; May 16-20, 1999.*

(Continued)

*Primary Examiner* — Robert Tavlykaev
(74) *Attorney, Agent, or Firm* — Maschoff Brennan (57) ABSTRACT

An electro-optic Mach-Zehnder modulator includes a first optical waveguide forming a first arm of the Mach-Zehnder modulator, and a second optical waveguide forming a second arm thereof. The first or second optical waveguide includes capacitive segments that are spaced apart from one another, each forming an electrical capacitor. A travelling wave electrode arrangement applies a voltage across the first or second optical waveguide. The travelling wave electrode arrangement includes waveguide electrodes arranged on the capacitive segments, an electrical line extending along a part of the first or second optical waveguide, the electrical line being arranged a distance from the waveguide electrodes, and connecting arrangements, each being assigned to one of the waveguide electrodes. Each connecting arrangement includes at least two connecting structures spaced apart from one another wherein the waveguide electrodes each are electrically connected to the electrical line via the assigned two connecting structures.

3 Claims, 6 Drawing Sheets (52) U.S. Cl.
CPC ............ *G02F 1/2257* (2013.01); *G02F 1/218* (2013.01); *G02F 2001/212* (2013.01); *G02F 2201/127* (2013.01)

(56) References Cited

OTHER PUBLICATIONS

"Analysis of segmented traveling-wave optical modulators," by Li et al, Journal of Lightwave Technology, vol. 22, No. 7, Jul. 2004.*
"Signal integrity and radiated emission of high-speed digital systems", by Caniggia, John Wiley & Sons, 2008.*
K-O Velthaus et al: High performance InP-based Mach-Zehnder modulators for 10 to 100 Gb/s optical fiber Transmission systems, May 22, 2011.
Jaeger N A F et al: Velocity-matched electrodes for compound semiconductor traveling-wave electrooptic modulators: experimental results, Feb. 1, 1996.
Jaeger N A F et al: Capacitively-loaded travelling-wave electrodes for electro-optic modulators, Sep. 5, 1995.
Walker: High-speed III-V Semiconductor Intensity Modulators, Mar. 3, 1991.
Hoffmann: 45 GHz Bandwidth Travelling Wave Electrode Mach-Zehnder Modulator with Integrated Spot Size Converter, Jun. 4, 2004.
Brast et al: Monolithic 100 Gb/s Twin-IQ Mach Zehnder Modulators for Advanced Hybrid High-Capacity Transmitter Boards, 2004.

* cited by examiner

ELECTRO-OPTIC MACH-ZEHNDER MODULATOR AND METHOD FOR FABRICATING AN ELECTRO-OPTIC MACH-ZEHNDER MODULATOR

CROSS-REFERENCE TO A RELATED APPLICATION

This application is a National Phase Patent Application of International Patent Application Number PCT/EP2012/061817, filed on Jun. 20, 2012, which claims priority of European Patent Application Number 11170538.0, filed on Jun. 20, 2011.

BACKGROUND

The invention relates to an electro-optic Mach-Zehnder modulator and a method for fabricating a Mach-Zehnder modulator.

It is known in the art to use Mach-Zehnder interferometers as electro-optic modulators in optical high-speed transmission systems, wherein, for example, travelling wave electrodes (TWE) are used to induce a phase shift in the interferometer arms. Examples of such TWE-Mach-Zehnder modulators are described in the publication "High-Speed III-V Semiconductor Intensity Modulators", Robert G. Walker, IEEE Journal of Quantum Electronics Vol. 27, No. 3, March 1991.

SUMMARY

It is an object of the invention to provide an electro-optical Mach-Zehnder modulator having an improved frequency response. It is another object of the invention to provide a method of fabricating such a Mach-Zehnder modulator.

According to an exemplary embodiment of the invention, an electro-optical Mach-Zehnder modulator is provided, comprising
  a first optical waveguide forming a first arm of the Mach-Zehnder modulator;
  a second optical waveguide forming a second arm of the Mach-Zehnder modulator, wherein
  the first and/or the second optical waveguide comprises a plurality of capacitive segments spaced apart from one another, the capacitive segments each forming an electrical capacitor; and
  a travelling wave electrode arrangement for applying a voltage across the first and/or the second optical waveguide, the travelling wave electrode arrangement comprising
    a plurality of waveguide electrodes arranged on the capacitive segments;
    at least one electrical line (e.g. a microwave line) extending at least partially along a part of the first and/or the second optical waveguide, the electrical line being arranged in a distance from the waveguide electrodes; and
    a plurality of connecting arrangements, wherein a connecting arrangement is assigned to each of the waveguide electrodes, the connecting arrangements each comprising at least two connecting structures spaced apart from one another or a single wide connecting structure having a width of at least 20% of the length of the assigned waveguide electrode, wherein the width of the wide connecting structure and the length of the waveguide electrode are measured along the first and/or the second optical waveguide, and wherein the waveguide electrodes each are electrically connected to the electrical line via the assigned two connecting structures or the assigned single wide connecting structure, respectively.

The capacitive segments of the first and/or the second optical waveguide provide a capacitive load such that the travelling wave electrode arrangement is capacitively loaded. The waveguide electrodes and thus the capacitive segments of the first and the second optical waveguide are connected to the electrical line, wherein the connection between each waveguide electrode and the electrical line is established either via two connecting structures assigned to the respective waveguide electrode or via a single wide connecting structure assigned to the waveguide electrode. Conventional Mach-Zehnder modulators using capacitively loaded travelling wave electrodes comprise single small connecting structures (in the form of contact bridges) for connecting the waveguide electrodes to the electrical line.

Using two connecting structures (e.g. in the form of contact bridges) and/or a wide connecting structure (e.g. a wide contact bridge) for connecting the waveguide electrodes to the electrical line modifies the electrical behaviour of a travelling wave electrode arrangement in that in addition to the capacitive load induced by the capacitive segments of the waveguides an inductive component is introduced. The additional inductive component can be for example used to shape the frequency behaviour of the electrical effective index of the travelling wave electrode arrangement in such a way that it either remains essentially constant over a pre-determined frequency range or decreases over a pre-determined frequency range. Further, the additional inductive component can be used to adapt the impedance of the travelling wave electrode arrangement as will be set forth further below.

More particularly, using at least two connecting structures (e.g. a pair of connecting structures) or a single wide connecting structure per waveguide electrode, the effective microwave index of the travelling wave electrode arrangement can be adapted in such a way that it at least substantially equals the optical effective index of the first or the second optical waveguide, wherein the capacitive load of the electrodes may remain unchanged. For example, the pairs of connecting structures and/or the wide connecting structure are designed in such a way that the electrical effective index is 3.6 over a predetermined frequency range, e.g. from 20 to 40 GHz.

Adapting the effective electrical index of the travelling wave electrode arrangement to the optical index of the waveguides has the effect that the velocity of the electrical field matches the velocity of the optical field such that an effective interaction between the electrical and the optical field can be achieved over a broad frequency range. The effective interaction between the electrical and the optical field in turn results in a high electro-optic bandwidth and may allow to use a lower driving voltage and/or shorter interferometer arms, i.e. shorter devices.

As already mentioned above, the at least two connecting structures and/or the single wide connecting structure can be formed as contact bridges. For example, the electrical line is separated from the first and/or the second optical waveguide by an isolation groove, wherein the two connecting structures and/or the single wide connecting structure extend over the isolation groove.

It is possible that some of the waveguide electrodes are connected to the electrical line via at least two connecting structures and other waveguide electrodes each are connected to the electrical line via a single wide connecting structure. However, it is also possible that identical connecting arrangements are assigned to the waveguide electrodes, i.e. each one of the waveguide electrodes is connected to the electrical line via two connecting structures or each one of the waveguide electrodes is connected to the electrical line via a single wide connecting structure. It is further noted that at least one of the connecting arrangements comprises exactly two connecting structures. However, it is also conceivable that at least one of the connecting arrangements comprises more than two connecting structures.

If at least one of the waveguide electrodes is connected to the electrical line via a wide connecting structure, the inductive component introduced by the wide connecting structure is adapted by choosing the width—measured in a direction along the first and/or the second optical waveguide—of the wide connecting structure (or of the plurality of wide connecting structures if several or all connecting arrangements comprise a wide connecting structure) in such a way that the electrical effective index of the travelling wave electrode arrangement is substantially constant or decreases over at least a frequency range from 20 to 40 GHz. Similarly, if at least one waveguide electrode is connected via two connecting structures to the electrical line, the two connecting structures are configured and arranged (e.g. by adapting the width and/or the position of the connecting structures) in such a way that the electrical effective index of the travelling wave electrode arrangement is substantially constant or decreases over at least a frequency range from approximately 20 to 40 GHz.

In an exemplary embodiment of the invention, the width of the wide connecting structure(s) (and/or the width and/or the location of the two connecting structures) is chosen in such a way or or the two connecting structures are configured and arranged in such a way that the electrical effective index of the travelling wave electrode arrangement is essentially constant or decreases over at least a frequency range from approximately 10 to 60 GHz.

For example, the wide connecting structure—if present—has a width of at least one third or one half of the length—measured along the first and/or the second optical waveguide—of the assigned waveguide electrode. For example, the wide connecting structure has a width of at least 20 μm or at least 50 μm. In another embodiment, the width of wide connecting structure is at least 90% of the length—measured along the first and/or the second optical wave guide—of the assigned waveguide electrode or substantially equals the length of the assigned waveguide electrode. For example, the wide connecting structure has a width of at least 150 μm or at least 200 μm. If several or all connecting arrangements consist of a wide connecting structure, the wide connecting structures may have different widths. However, it is, of course, also possible that all of the provided wide connecting structures have the same width.

Further, a plurality of connecting arrangements may comprise a wide connecting structure such that the Mach-Zehnder modulator comprises a plurality of wide connecting structures, wherein the wide connecting structures are arranged in a distance from one another (along the direction of the modulator, i.e. along the first and/or second optical waveguide) such that a gap is formed between them.

However, it is also conceivable that the Mach-Zehnder modulator comprises a plurality of wide connecting structures, wherein the wide connecting structures are integrally connected to one another. For example, the plurality of wide connecting structures is formed by a continuous contact structure extending along the first and/or the second optical waveguide. In particular, a plurality of subsections (having the width of the assigned waveguide electrode) of the continuous contact structure form the plurality of wide connecting structures, wherein the subsections are integrally connected to one another via portions of the continuous contact structure.

In other words, the plurality of wide connecting structures is formed by a single continuous structure that, for example, overlaps with the first or the second optical waveguide. For example, the continuous contact structure extends over a groove between the electrical line and the waveguide electrodes (i.e. between the electrical line and the capacitive segments of the waveguides) and/or over a space between neighbouring waveguide electrodes, wherein the groove and/or the space between neighbouring waveguide electrodes may be filled with an electrically isolating material such as a BCB (benzocyclobutene).

It is further possible that both the first and the second optical waveguide comprise capacitive segments. Further, a first and a second electrical line can be provided, wherein the first electrical line is connected to the waveguide electrodes arranged on the capacitive segments of the first optical waveguide and the second electrical line is connected to the waveguide electrodes arranged on the capacitive segments of the second optical waveguide. For example, the electrical lines are coplanar lines arranged coplanar to the waveguide electrodes.

However, it is also conceivable that either the first or the second optical waveguide does not comprise capacitive segments such that only one arm of the Mach-Zehnder modulator will be modulated, i.e. a voltage is applied to only one arm of the modulator.

Further more, if at least one of the capacitive segments is connected to the electrical line via two connecting structures (a first and a second connecting structure) the first connecting structure can be connected to a first end of the waveguide electrode and the second connecting structure can be connected to a second end of the waveguide electrode. For example, a lateral side (extending perpendicular relative to the first and the second optical waveguide) of the first connecting structure is aligned with a face side of the waveguide electrode.

However, it is also possible that the two connecting structures are arranged within a certain distance from the ends of the waveguide electrode. For example, the two connecting structures are placed in such a way that the distance between the respective end of the waveguide electrode and the connecting structures does not exceed a tenth of the length of the waveguide electrode. For example, the distance between the connecting structure and the respective waveguide electrode end is less than 20 μm.

According to another example of the invention, the distance between the first and the second connecting structure is at least half of the length—measured along the first and/or the second optical waveguide—of the assigned waveguide electrode or at least two thirds of the length of the assigned waveguide electrode.

The width and the location (e.g. the distance between the two connecting structures) can be used to adapt both the electrical effective index and the impedance of the travelling wave electrode arrangement. Similarly, the width of the wide connecting structure may have a considerable influence on both the electrical effective index and the impedance of the travelling wave electrode arrangement.

In addition to the design of the two connecting structures and/or the width of the wide connecting structure(s), however, other means can be used for adapting the impedance of the travelling wave electrode arrangement. For example, the width—measured perpendicular to the first and/or the second optical waveguide—of the electrical line can be varied, wherein the width may be chosen in such a way that the impedance neither exceeds a pre-determined maximum nor drops below a pre-determined minimum, for example at least in the frequency range from 20 to 40 GHz. For example, the impedance lies within the range from 45 and 50 Ω or is substantially 50 Ω in this frequency range.

The Mach-Zehnder modulator according to the invention has an input section and/or an output section that comprises for example, a Y-branch splitter or a multimode interference coupler (MMI coupler) connected to the first and the second optical waveguide. Further, the input section and/or the output section of the modulator may comprise a spot size converter for matching the input/output optical mode of the modulator to the mode of an optical fibre. An example of a possible principal optical and electrical layout of the Mach-Zehnder modulator according to the invention is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, wherein the content of this article in respect to the optical and electrical design of the Mach-Zehnder modulator is incorporated by reference herewith. It is noted, however, that the invention is of course not restricted to a particular basic design of the Mach-Zehnder modulator. For example, the optical waveguides could also be formed as strongly guiding ("deep ridge") waveguides as disclosed in U.S. patent application Ser. No. 12/638,372 (published as 2010/0150494 A1), which is also incorporated by reference herewith.

The Mach-Zehnder modulator according to the invention is, for example, formed as a semiconductor device. In particular, the Mach-Zehnder modulator is fabricated using indium phosphide or gallium arsenide technology, i.e. the modulator is fabricated on an indium phosphide or a gallium arsenide substrate.

For example, the capacitive segments of the modulator arms comprise a p-doped layer, wherein the p-doped layer can be removed between adjacent capacitive segments (the active sections of the waveguides) in order to reduce the optical loss in the waveguide sections between the capacitive segments (i.e. in the passive sections of the waveguides). It is possible to replace the removed p-doped sections between the capacitive segments by another material, e.g. by intrinsic or semi-insulating material, for example using the "selective area growth" technique as described in U.S. patent application Ser. No. 12/638,372 already mentioned above.

The p-doped layer in the capacitive segments may form part of a p-i-n-diode, wherein the isolating region of the p-i-n-diode is formed by at least one isolating layer arranged between the p-doped layer and an n-doped layer or an n-doped substrate. It is, however, also possible that other kinds of diodes are realized by the capacitive segments such as n-i-n diodes and/or Schottky diodes.

The invention also relates to a method of fabricating an electro-optic Mach-Zehnder modulator comprising the steps of:
providing a first optical waveguide forming a first arm of the Mach-Zehnder modulator;
providing a second optical waveguide forming a second arm of the Mach-Zehnder modulator;
forming a plurality of capacitive segments of the first and/or the second optical waveguide, the capacitive segments being spaced apart from one another and each forming an electrical capacitor; and
providing a travelling wave electrode arrangement for applying a voltage across the first and/or the second optical waveguide, comprising
arranging a plurality of waveguide electrodes on the capacitive segments;
forming an electrical line extending along at least a part of the first and/or the second optical waveguide, the electrical line being arranged in a distance from the waveguide electrodes,
forming at least two connecting structures or a single wide connecting structure for each one of the waveguide electrodes in such a way that the waveguide electrodes are electrically connected to the electrical line via the at least two connecting structures or the single wide connecting structure, respectively, wherein the width of the wide connecting structure is chosen to be at least 20% of the length of the assigned waveguide electrode, the width of the wide connecting structure and the length of the waveguide electrode being measured along the first and/or the second optical waveguide.

In an exemplary embodiment the method comprises pre-determining (pre-setting) a desired electrical effective index and/or a desired impedance of the travelling wave electrode arrangement, and choosing the width of the wide connecting structure dependent on the pre-determined (pre-set) electrical effective index (e.g. an electrical effective index range in a pre-determined frequency range) and/or desired impedance (e.g. an impedance range in a pre-determined frequency range) of the travelling wave electrode arrangement.

In other words, the width of the wide connecting structure (s)—if present—can be used as a design parameter to meet requirements of the electrical design of the Mach-Zehnder modulator (as already explained above). For example, the width of the wide connecting structure(s) is varied (e.g. using a simulation, i.e. a model of the travelling wave electrode arrangement) until the desired electrical effective index range and/or the desired impedance range is met. This embodiment could also be used without specifying a particular minimal width (such as at least 20% of the length of the waveguides) of the wide connecting structure.

Similarly, the design (width, number and/or position) of the at least two connecting structures can be chosen dependent on the pre-determined electrical effective index and/or impedance of the travelling wave electrode arrangement.

BRIEF DESCRIPTION OF THE DRAWINGS

Embodiments of the invention will be described in more detail hereinafter with reference to the drawings.

DETAILED DESCRIPTION

Figure 1:
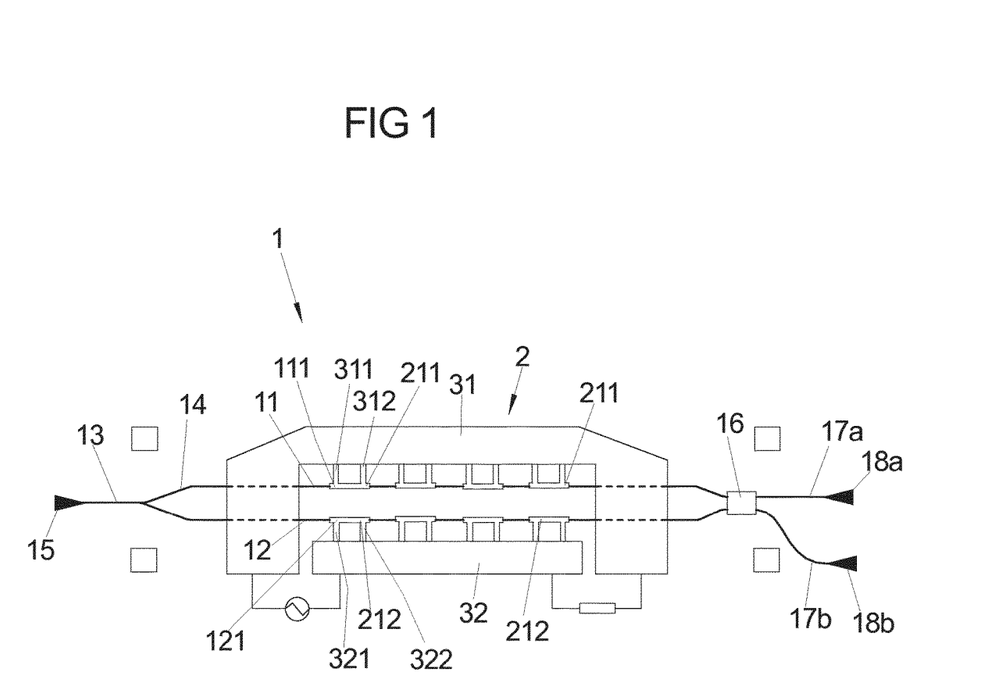
FIG. 1 illustrates a top view of an electro-optic Mach-Zehnder modulator according to an embodiment of the invention.
Figure 3:
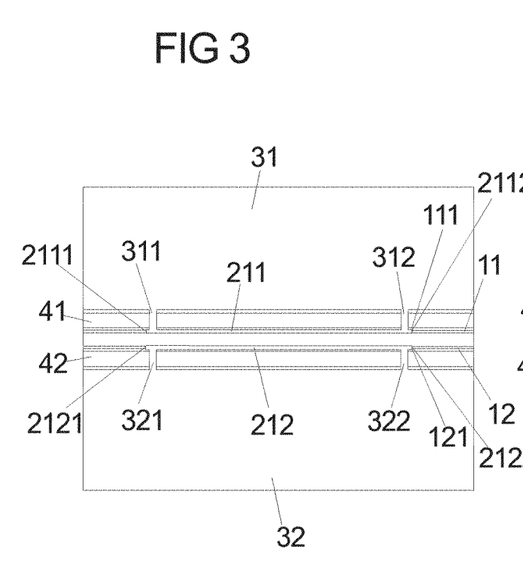
FIG. 3 shows a detail of the Mach-Zehnder modulator illustrated in FIG. 1.

The Mach-Zehnder modulator 1 according to an embodiment of the invention illustrated in FIGS. 1 and 3 comprises a first and a second integrated optical waveguide 11, 12, wherein the first and the second optical waveguides 11, 12 form the arms of an interferometer section of the Mach-Zehnder modulator.

An input section of the Mach-Zehnder modulator 1 comprises an input waveguide 13 connected to a Y-coupler 14 whose branches are connected to the first and the second optical waveguide 11, 12. Further, a spot size converter 15 is provided for reducing the coupling loss between an optical fibre (not shown) and the input waveguide 13. An output section of the Mach-Zehnder modulator 1 comprises a multimode interference coupler (MMI) 16 connected to output ends of the first and second optical waveguide 11, 12, wherein two output waveguides 17*a*, 17*b* are provided connected the MMI 16 and to spot size converters 18*a*, 18*b*.

Further, the Mach-Zehnder modulator 1 comprises a travelling wave electrode arrangement 2 having a plurality of waveguide electrodes 211, 212 arranged on top of capacitive segments 111, 121 (active waveguide sections) formed by the first and the second optical waveguides 11, 12, respectively. The travelling wave electrode arrangement 2 further comprises a first (U-shaped) electrical line in the form of a first microwave line 31 and a second electrical line in the form of a second microwave line 32, wherein a middle section of the first microwave line 31 and the whole second microwave line 32 extend parallel to the first and the second optical waveguides 11, 12 and substantially coplanar to the waveguide electrodes 211, 212. It is noted that the U-shaped design of the first microwave line 31 is of course only exemplary. Other designs are also possible, for example, the first microwave line 31 could be a straight line or may have a first ending that crosses the optical waveguides 11, 12 and second ending that extends away from the optical waveguides 11, 12.

The microwave lines 31, 32 are disposed in a distance from the first and second optical waveguide 11, 12 and thus in a distance from the waveguide electrodes 211, 212. Between the first and second optical waveguide 11, 12 and the microwave lines 31, 32 isolation grooves 41, 42 are arranged, the isolation grooves 41, 42 providing electrical isolation between the waveguide electrodes 211, 212 and the microwave lines 31, 32 (see FIG. 3).

A high frequency voltage is supplied to a first end (facing towards the input section of the modulator) of the microwave lines 31, 32, whereas a second end of the microwave lines 31, 32 is terminated using for example a 50 Ω resistor. The basic optical and electrical layout of the Mach-Zehnder modulator 1 is described in the publication "45 GHz Bandwidth Travelling Wave Electrode Mach-Zehnder Modulator with Integrated Spot Size Converter", D. Hoffmann, Proceedings International Conference on Indium Phosphide and Related Materials, p. 585, 2004, already mentioned above. However, as already set forth above, the invention is not restricted to a particular basic optical or electrical design of the Mach-Zehnder modulator. For example, the basic optical or electrical design of the modulator could also follow the modulator layout described in U.S. patent application Ser. No. 12/638,372.

Each one of the waveguide electrodes 211 arranged on the first optical waveguide 11 is integrally connected to the first microwave line 31 via a connecting arrangement consisting of a pair of connecting structures in the form of contact bridges 311, 312. Similarly, each one of the waveguide electrodes 212 arranged on the second optical waveguide 12 is integrally connected to the second microwave line 32 via a pair of contact bridges 321, 322 (see also FIG. 3 showing in detail the pairs of contact bridges). The isolation grooves 41, 42 and/or the space between the waveguide electrodes 211, 212 could be filled with an insulating material such as BCB.

The contact bridges 311, 312 and 321, 322, respectively, are each positioned near endings 2111, 2112 and 2121, 2122 of the waveguide electrodes 211, 212 such that the distance between the contact bridges 311, 312 and 321, 322, respectively, compares to the length of the waveguide electrodes 211, 212; e.g. the distance between the contact bridges is at least 80% or 90% of the length of the assigned waveguide electrode. It is noted that the waveguide electrodes 211, 212 do not necessarily extend over the complete length of the capacitive sections 111, 121. Rather, it is possible that the capacitive sections 111, 121 are longer and extend beyond the ends of the assigned waveguide electrodes.

Figure 5:
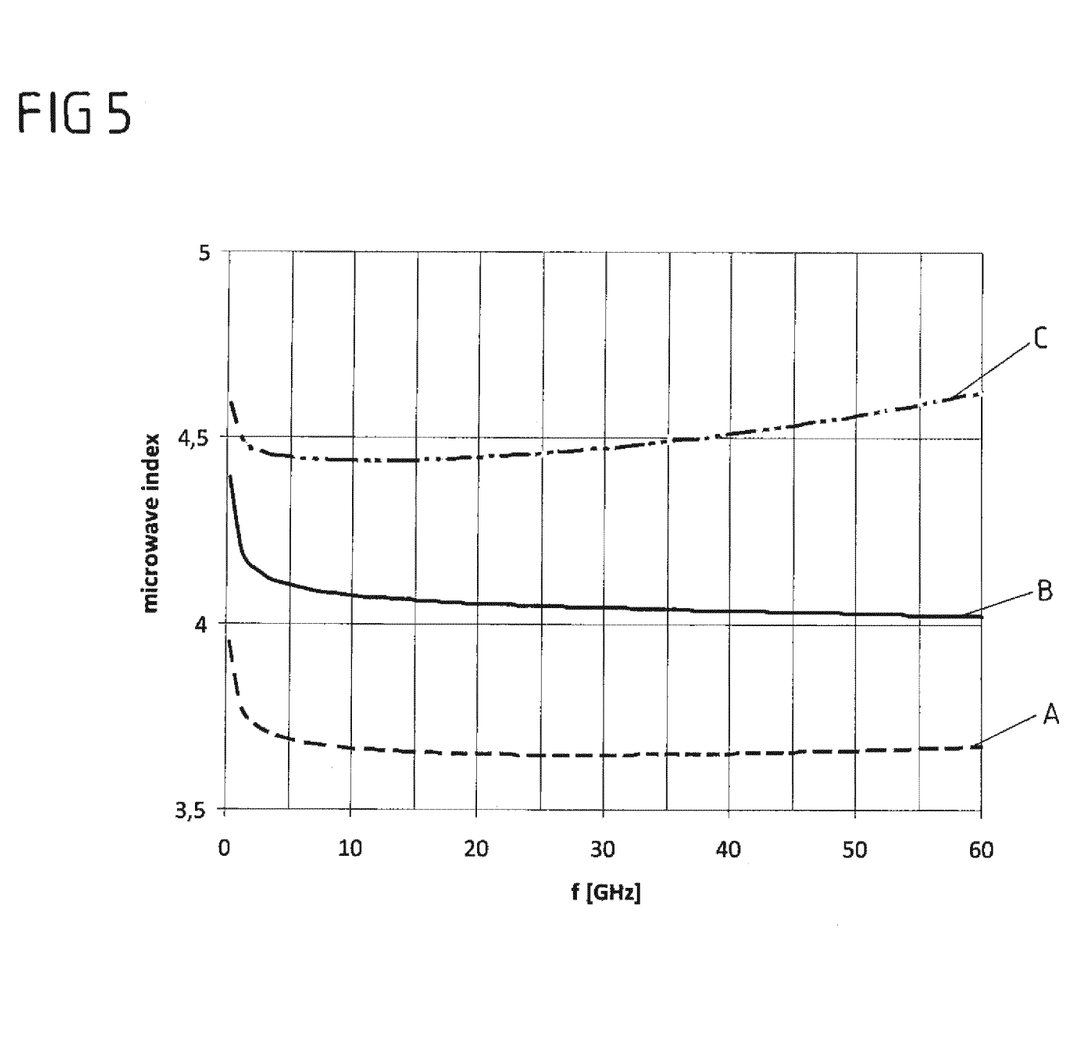
FIG. 5 depicts the frequency behaviour of an electrical effective index of the travelling wave electrode arrangement of different Mach-Zehnder modulators.
Figure 6:
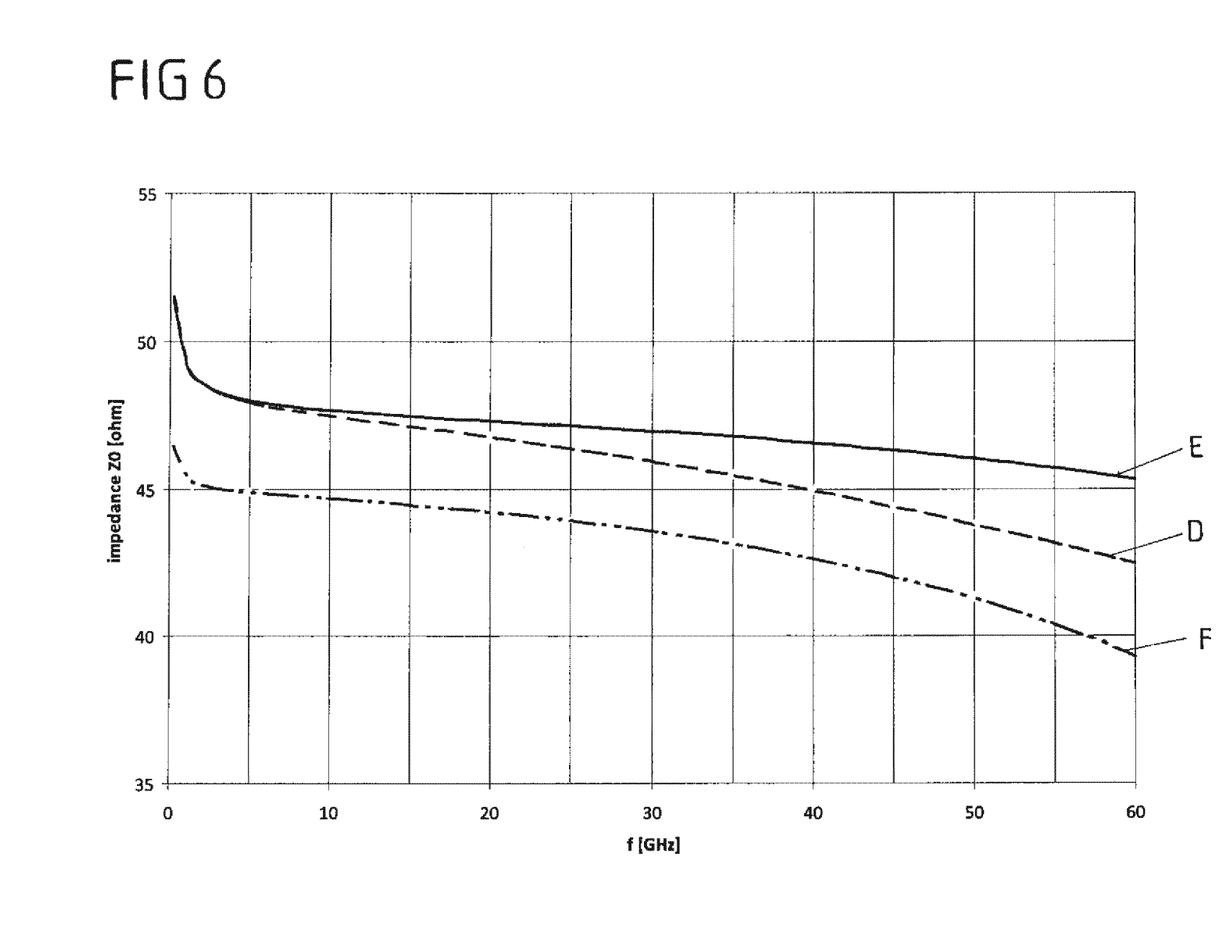
FIG. 6 shows the frequency behaviour of the impedance of a travelling wave electrode arrangement of different Mach-Zehnder modulators.

The pairs of contact bridges 311, 312 and 321, 322, respectively, introduce an inductive component (in addition to the capacitive load induced by the capacitive waveguide segments 111, 121), that can improve the frequency characteristics of the electrical effective index of the travelling wave electrode arrangement 2 and/or the frequency characteristics of the impedance of the travelling wave arrangement 2 (see FIGS. 5 and 6). In order to optimize the frequency characteristics of the electrical effective index and/or the impedance of the travelling wave arrangement the distance between the contact bridges 311, 312 and 321, 322, respectively, and the width (in the direction of the waveguides 11, 12) can be varied.

Figure 2:
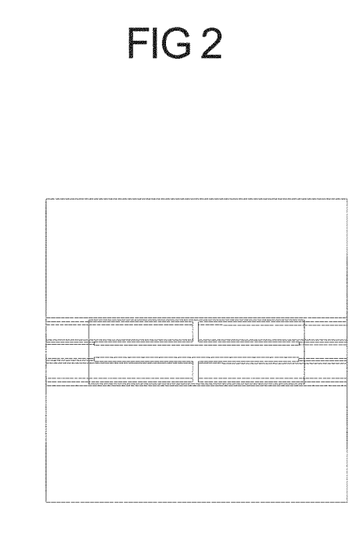
FIG. 2 shows a detail of a conventional Mach-Zehnder modulator.

For example, the width of the contact bridges 311, 312 and 321, 322 compares to the width of a contact bridge used in a conventional Mach-Zehnder modulator (comprising small single contact bridges for connecting the waveguide electrodes to the microwave lines as shown in FIG. 2). For example, the width of the contact bridges 311, 312 and 321, 322 is in the range between 2 and 10 μm.

Figure 4:
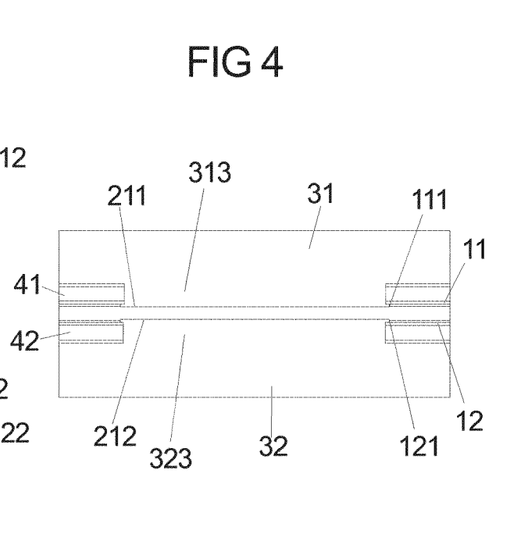
FIG. 4 shows a detail of a Mach-Zehnder according to another embodiment of the invention.

According to another embodiment of the invention, instead of pairs of contact bridges 311, 312 and 321, 322 a single wide electrode could be used as illustrated in FIG. 4. According to FIG. 4, wide connecting structures in the form of continuous wide contact bridges 313, 323 are used to connect the first microwave line 31 to the waveguide electrodes 211 on the capacitive segment 111 of the first optical waveguide 11 and to connect the second microwave line 32 to the waveguide electrode 212 on top of the capacitive segment 121 of the second optical waveguide 12, respectively.

The width—measured along the longitudinal direction of the first and second optical waveguide 11, 12—of the wide contact bridges 313, 323 is only slightly shorter than the length of the waveguide electrodes 211, 212. It is also possible that the width of the contact bridges 313, 323 is identical to the length of the waveguide electrodes 211, 212.

The microwave line 31, the wide contact bridge 313 and the waveguide electrode 211 may be integrally formed. Similarly, the other microwave line 32, the wide contact bridge 323 and the waveguide electrode 212 may be integrally formed, wherein the microwave lines 31, 32, the wide contact bridges 313, 323 and the waveguide electrodes 211, 212 may be generated by electroplating.

The wide contact bridges 313, 323 similarly to the contact bridge pairs 311, 312 and 321, 322 allow to shape the effective microwave index (effective electrical index) of the travelling wave electrode arrangement 2 in a pre-determined frequency range. For example, the wide contact bridges 313, 323 are designed in such a way that the effective microwave index is substantially constant in a pre-determined frequency range (e.g. 20 to 40 GHz) or decreases in that frequency range. The frequency behavior of the microwave effective index of the travelling wave electrode arrangement comprising wide contact bridges as illustrated in FIG. 4 and pairs of contact bridges as shown in FIG. 3, respectively, is shown in FIG. 5.

Referring to FIG. 5 (curve A), if each of the waveguide electrodes is connected to the respective microwave line via a pair of (e.g. conventionally sized) contact bridges as shown in FIG. 1 ("two contact bridges design"), the microwave effective index at lower frequencies drops and is substantially constant at higher frequencies (e.g. in the range between 20 to 40 GHz). The index slightly raises again at higher frequencies (above 40 GHz). If all of the waveguide electrodes are connected via a single wide contact bridge as shown in FIG. 4 ("wide contact bridge design"), the microwave effective index decreases over the range between 0 to 60 GHz (see curve B), wherein it shows a similar drop at lower frequencies (below 5 GHz) as curve A.

It is noted that the frequency behavior of the microwave effective index will also be influenced by the design of the coplanar microwave lines 31, 32 (in particular by the width perpendicular to the optical waveguides 11, 12 of the microwave lines 11, 12). Therefore, the frequency behavior of the microwave effective index can be optimized by adapting the design of the microwave lines 31, 32.

Figure 7:
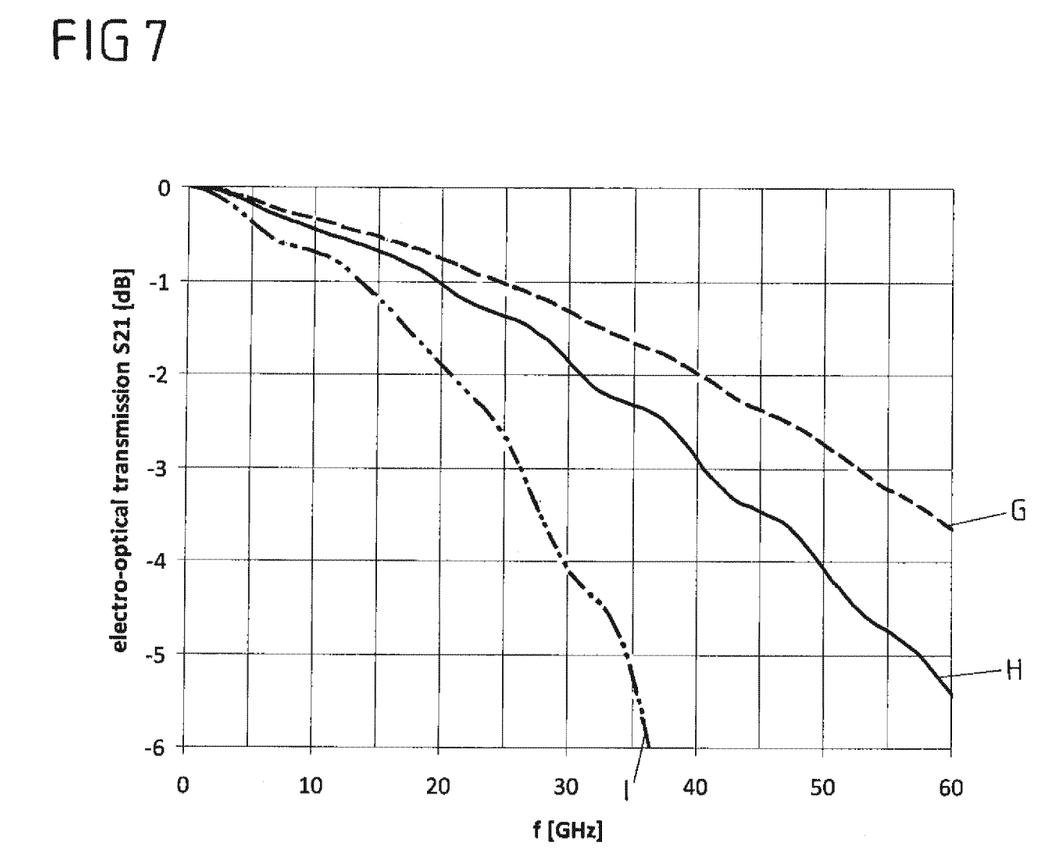
FIG. 7 shows the electro-optic frequency response of different Mach-Zehnder modulators.

Curve C also shown in FIG. 5 relates to a conventionally designed travelling wave electrode arrangement (as shown in FIG. 2) used in a conventional Mach-Zehnder modulator. The microwave effective index of such a travelling wave electrode arrangement increases over the frequency range between 10 and 60 GHz and thus especially at higher frequencies will not be adapted to the (substantially constant) optical index resulting in a reduced electro-optic bandwidth, c.f. FIG. 7.

FIG. 6 illustrates that using the two contact bridges design or the wide contact bridge design according to the invention, may also flatten the frequency response of the impedance of the travelling wave electrode arrangement. For example, it is possible to obtain an impedance which in the range between approximately 10 and approximately 40 GHz lies between 45 and 50 Ω (curve D: two contact bridges design, curve E: wide contact bridge design). The impedance of a conventional electrode arrangement (single small contact bridges) represented by curve F decreases more strongly in the higher frequency range such that the conventional electrode arrangement can be adapted to a pre-determined impedance (e.g. the standard 50 Ω impedance) only within a small frequency range. For example, if the impedance is adapted within a lower frequency range, a reduction of the electrical power and reflections and thus frequency dependent power drops will occur in the higher frequency range due to the lower impedance in that frequency region.

FIG. 7 shows the electro-optical behaviour of different Mach-Zehnder modulators having travelling wave electrode arrangement comprising the two contact bridges design (curve G), the wide contact bridge design (curve H) or the conventional design (curve I). The Mach-Zehnder modulators according to the invention, i.e. comprising the two contact bridges design (curve G) and the wide contact bridge design (curve H), respectively, show a significantly higher electro-optical bandwidth than a conventional modulator (curve I). In fact, the invention allows to nearly double the electro-optical bandwidth, although other properties of the modulator such as insertion loss and driving voltage may remain unchanged.

Figure 8:
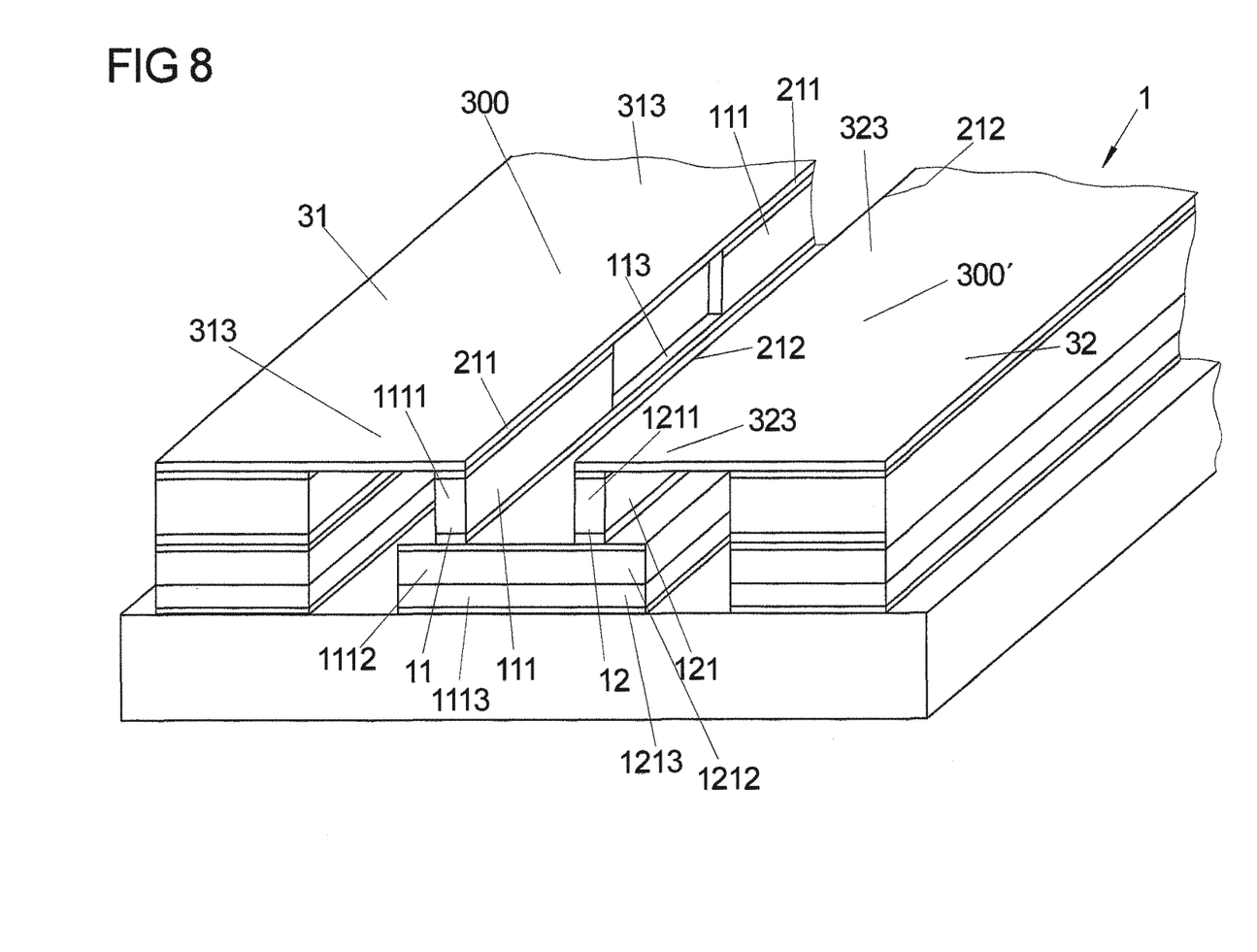
FIG. 8 shows a perspective view of a Mach-Zehnder modulator according to another embodiment of the invention.

FIG. 8 shows a perspective view of a Mach-Zehnder modulator 1 according to another embodiment of the invention. The capacitive waveguide segments 111, 121 (active waveguide segments) comprise a p-doped region 1111, 1211, an isolating region 1112, 1212 and an n-doped region 1113, 1213 such that p-i-n diodes are formed that provide the capacitive load of the travelling wave electrode arrangement. The p-doped region is at least partially removed between adjacent capacitive waveguide segments such that passive waveguide segments 113 are formed.

Further, the plurality of capacitive segments 111, 121 of the optical waveguides 11, 12 are connected to the first and the second microwave lines 31, 32 via a plurality of wide contact bridges 313, 323 that extend over the whole length of the capacitive segments 111, 121, i.e. over the whole length of the waveguide electrodes 211, 212 arranged on top of the capacitive segments 111, 121.

The contact bridges 313, 323 connected to the waveguide electrodes 211, 212 are formed by continuous contact bridges 300, 300' (contact structure) integrally formed with the waveguide electrodes 211, 212, respectively, wherein the continuous contact bridges 300, 300' extend along the first and the second optical wave guide 11, 12 and over both the capacitive segments 111, 121, respectively, and the passive waveguide segments 113. The gap between the passive waveguide segments 113 and the continuous contact bridge 300 could be filled with an isolating material such as BCB. The contact bridges 313, 323 are thus integrally connected to one another, wherein they are formed by subsections of the continuous contact bridges 300, 300', respectively. These subsections are connected to one another by portions of the continuous contact bridges 300, 300' between the contact bridges 313, 323.

It is noted that in another embodiment of the invention the passive waveguide segments 113 after removing the p-doped region can be re-grown using e.g. intrinsic (undoped) or semi-insulating material, e.g. by selective area growth as already mentioned above. An isolating material could be arranged between the re-grown passive waveguide segments and the continuous contact bridge 300. Also, the capacitive waveguide segments 111, 121 do not necessarily form a p-i-n diode. Rather, other diode types such as n-i-n diodes could be formed.

It is noted that features of the embodiments shown in FIGS. 1, 3, 4 and 8 could also be used in combination. For example, some of the contact bridge pairs 311, 312 or 321, 322 in FIG. 1 could be substituted by wide contact bridges 313, 323 as shown in FIG. 4 or a continuous contact bridge 300 as depicted in FIG. 8.

REFERENCE SIGNS

1 Mach-Zehnder modulator
2 travelling wave electrode arrangement
11 first optical waveguide
12 second optical waveguide
13 input waveguide 14 Y-splitter
15, 18a, 18b spot size converter
16 MMI
17a, 17b output waveguides
31 first microwave line
32 second microwave line
41, 42 isolation groove
111, 121 capacitive segment
113 passive waveguide segment
211, 212 waveguide electrode
300, 300' continuous contact bridge
311, 312, 321, 322 contact bridge
313, 323 wide contact bridge
1111, 1211 p-doped region
1112, 1212 isolating region
1113, 1213 n-doped region
2111, 2112 end of waveguide electrode
2121, 2122 end of waveguide electrode

The invention claimed is:

1. An electro-optic Mach-Zehnder modulator, comprising
a first optical waveguide forming a first arm of the Mach-Zehnder modulator;
a second optical waveguide forming a second arm of the Mach-Zehnder modulator, wherein
the first and/or the second optical waveguide comprises a plurality of capacitative segments spaced apart from one another, the capacitive segments each forming an electrical capacitor; and
a travelling wave electrode arrangement for applying a voltage across the first and/or the second optical waveguide, the travelling wave electrode arrangement comprising
a plurality of waveguide electrodes arranged on the capacitive segments
at least one electrical line extending at least partially along a part of the first and/or the second optical waveguide, the electrical line being arranged in a distance from the waveguide electrodes; and
a plurality of connecting arrangements, wherein a connecting arrangements is assigned to each of the waveguide electrodes, the connecting arrangements each comprise a single wide connecting structure having a width that equals the length of the assigned waveguide electrode, wherein the width of the wide connecting structure and the length of the waveguide electrode are measured along the first and/or the second optical waveguide, and wherein the waveguide electrodes each are electrically connected to the electrical line via the assigned single wide connecting structure, wherein the plurality of wide connecting structures is formed by a continuous contact structure extending along the first and/or the second optical waveguide, wherein the wide connecting structures are formed by portions of the continuous contact structure.

2. The Mach-Zehnder modulator as claimed in claim 1, wherein the capacitive seg-ments comprise at least one p-doped layer, wherein the p-doped layer is removed between adjacent capacitive segments such that passive waveguide segments are formed, and wherein the continuous contact structure extends over both the capaci-tive segments and the passive waveguide segments.

3. Method of fabricating an electro-optic Mach-Zehnder modulator as claimed in claim 1, comprising the steps of
providing a first optical waveguide forming a first arm of the Mach-Zehnder modulator;
providing a second optical waveguide forming a second arm of the Mach-Zehnder modulator;
forming a plurality of capacitive segments of the first and/or the second optical waveguide, the capacitive segments being spaced apart from one another and each forming an electrical capacitor; and
providing a travelling wave electrode arrangement for applying a voltage across the first and/or the second optical waveguide, comprising
arranging a plurality of waveguide electrodes on the capacitive seg-ments;
forming at least one electrical line extending along at least a part of the first and/or the second optical waveguide, the electrical line being arranged in a distance from the waveguide electrodes,
forming a single wide connecting structure for each one of the wave-guide electrodes in such a way that the waveguide electrodes are electrically connected to the electrical line via the single wide connecting structure, respec-tively, wherein the width of the wide connecting structure is chosen to equal the length of the assigned waveguide electrode, the width of the wide connecting structure and the length of the waveguide electrode being measured along the first and/or the second optical waveguide, wherein the plurality of wide connect-ing structures is formed by forming a continuous contact structure extending along the first and/or the second optical waveguide in such a way that the wide connecting structures are formed by portions of the continuous contact struc-ture.

* * * * *